United States Patent
Takeo

(10) Patent No.: US 8,738,728 B2
(45) Date of Patent: May 27, 2014

(54) INFORMATION PROCESSING APPARATUS THAT IDENTIFIES TRANSMISSION SOURCE, AND CONTROL METHOD AND STORAGE MEDIUM THEREFOR

(75) Inventor: Akinori Takeo, Yokohama (JP)

(73) Assignee: Canon Kabushiki Kaisha (JP)

(*) Notice: Subject to any disclaimer, the term of this patent is extended or adjusted under 35 U.S.C. 154(b) by 87 days.

(21) Appl. No.: 12/862,481

(22) Filed: Aug. 24, 2010

(65) Prior Publication Data

US 2011/0066698 A1   Mar. 17, 2011

(30) Foreign Application Priority Data

Sep. 11, 2009  (JP) ................... 2009-210493

(51) Int. Cl.
  *G06F 15/16*   (2006.01)
  *G06F 15/173*  (2006.01)
  *G06F 3/12*    (2006.01)
  *H04L 29/06*   (2006.01)

(52) U.S. Cl.
  CPC ............. *G06F 3/12* (2013.01); *G06F 3/1203* (2013.01); *H04L 29/06891* (2013.01)
  USPC .......... 709/217; 709/223; 709/224; 709/208; 358/1.15

(58) Field of Classification Search
  CPC .... G06F 2/12; G06F 2/1203; H04L 29/06891
  USPC .......... 709/221, 223, 208, 224, 217; 358/1.15
  See application file for complete search history.

(56) References Cited

U.S. PATENT DOCUMENTS

| | | | | |
|---|---|---|---|---|
| 6,981,036 B1 * | 12/2005 | Hamada | ........................ | 709/223 |
| 7,477,412 B2 * | 1/2009 | Miwa et al. | .................. | 358/1.15 |
| 8,095,627 B2 * | 1/2012 | Izaki et al. | .................... | 709/221 |
| 8,166,149 B2 * | 4/2012 | Ishimoto | ....................... | 709/223 |
| 8,218,180 B2 * | 7/2012 | Shobu | .......................... | 358/1.15 |

(Continued)

FOREIGN PATENT DOCUMENTS

| CN | 101082855 A | 12/2007 |
|---|---|---|
| JP | 2006-295883 A | 10/2006 |

(Continued)

OTHER PUBLICATIONS

European International Search Report issued on Sep. 2, 2011 in corresponding European patent application No. 10175889.4.

(Continued)

*Primary Examiner* — Asghar Bilgrami

(74) *Attorney, Agent, or Firm* — Rossi, Kimms & McDowell LLP

(57) ABSTRACT

An information processing apparatus capable of correctly identifying an image processing apparatus from which an event notification has been transmitted. The information processing apparatus, e.g., a PC, transmits to image processing apparatuses, e.g., MFPs, an event notification request packet that requests the MFPs to transmit an event notification upon occurrence of an event therein, acquires transmission source addresses from response packets sent from the MFPs in reply to the event notification request, and registers the acquired addresses. When receiving an event notification packet from any of the MFPs, the PC acquires a transmission source address from the event notification packet and compares the acquired address with the registered addresses, and determines that the MFP from which the event notification packet has been transmitted is one of registered MFPs, if the acquired address coincides with one of the registered addresses.

8 Claims, 15 Drawing Sheets

(56) References Cited

U.S. PATENT DOCUMENTS

| | | | |
|---|---|---|---|
| 2007/0273922 A1 | 11/2007 | Matsugashita | |
| 2008/0109870 A1* | 5/2008 | Sherlock et al. | 726/1 |
| 2010/0188699 A1* | 7/2010 | Ida et al. | 358/1.15 |

FOREIGN PATENT DOCUMENTS

| | | | |
|---|---|---|---|
| JP | 2007-317087 | A | 12/2007 |
| JP | 2008-160531 | A | 7/2008 |
| JP | 2009-164689 | A | 7/2009 |
| WO | 2009001718 | A1 | 12/2008 |

OTHER PUBLICATIONS

Korean office action issued in Korean counterpart application No. KR10-2010-0086324, dated Feb. 18, 2013.

Notification of Second Office Action for corresponding CN 201010283781.1, issue date Jan. 21, 2013. English translation provided.

* cited by examiner

FIG.7

| MANAGEMENT ID FIELD | DEVICE ID FIELD | EVENT REGISTRATION FIELD | IP ADDRESS FIELD |
|---|---|---|---|
| 1 | aaaaaa | ON | 2001:db8:aaaa::a/64 |
| 2 | bbbbbb | OFF | 2001:bbb:cccc::c/64 |
| 3 | cccccc | ON | 2001:ccc:eeee::e/64 |
| ... | ... | ... | ... |
| N | abcdef | ON | aaaa:bbbb:cccc:dddd |

| MANAGEMENT ID FIELD | NOTIFICATION DESTINATION IP ADDRESS FIELD | NOTIFICATION DESTINATION PORT NUMBER FIELD | NOTIFICATION OBJECT EVENT FIELD |
|---|---|---|---|
| 1 | 2001:db8:abcd::e/64 | 90050 | JobStateChanged. ComponentStateChanged |
| 2 | 2001:ddd:cccc::c/64 | 90000 | JobStateChanged |
| ... | ... | ... | ... |
| N | aaaa:bbbb:cccc:eeee | 99999 | ComponentStateChanged |

| MANAGEMENT ID FIELD 1301 | DEVICE ID FIELD 1302 | EVENT REGISTRATION FIELD 1303 | FIRST IP ADDRESS FIELD 1304 | SECOND IP ADDRESS FIELD 1305 |
|---|---|---|---|---|
| 1 | aaaaaa | ON | 2001:db8:aaaa::a/64 | 2001:db8:bbbb::b/64 |
| 2 | bbbbbb | OFF | - | - |
| 3 | cccccc | ON | 2001:ccc:eeee::e/64 | 2001:db8:bbbb::c/64 |
| ... | ... | ... | ... | ... |
| N | abcdef | ON | aaaa:bbbb:cccc:dddd | - |

INFORMATION PROCESSING APPARATUS THAT IDENTIFIES TRANSMISSION SOURCE, AND CONTROL METHOD AND STORAGE MEDIUM THEREFOR

BACKGROUND OF THE INVENTION

1. Field of the Invention

The present invention relates to an information processing apparatus that manages image processing apparatuses by processing packets received therefrom, and relates to a control method and a storage medium for the information processing apparatus.

2. Description of the Related Art

In recent office environments, image processing apparatuses or other network-connected devices are generally managed and controlled by application software running on a network-connected information processing apparatus.

To manage network-connected devices and jobs running thereon by an information processing apparatus, there has been proposed a technique for assigning in advance identification IDs to the devices and utilizing event notifications transmitted from these devices to the information processing apparatus (see, e.g., Japanese Laid-open Patent Publication No. 2007-317087). It has been also known to identify network-connected devices based on their IP addresses, which are information for identification of network nodes.

With network-connected devices becoming more diversified, IPv4 (which is a conventionally used version of Internet protocol) poses the problem of IP address exhaustion and other problems, and IPv6 becomes widely used to eliminate these problems.

Since IPv6 allows one network interface to have multiple IP addresses, an address selection rule called longest match is defined in RFC (Request for Comments) 3484. The longest match rule is to select an address having a longest prefix length from among transmission source IP addresses.

To identify network-connected devices based on IPv6 addresses, it is however necessary for application software to know in advance IP addresses of the devices. If IP addresses of a transmission source of a received packet are unknown, the information processing apparatus cannot determine the device from which the packet has been transmitted and is hence unable to correctly process the packet.

In order to identify devices, identification IDs of the devices can be provided aside from IP addresses, as disclosed in Japanese Laid-open Patent Publication No. 2007-317087. In that case, however, since packets transmitted from the devices to the information processing apparatus must each contain a corresponding identification ID, a problem is posed that existing devices and existing packet structures cannot be used without modifications, and processing at the devices and the packet structures must be modified.

SUMMARY OF THE INVENTION

The present invention provides an information processing apparatus capable of performing appropriate processing by correctly identifying an image processing apparatus which has a plurality of addresses and from which an event notification has been transmitted, and provides a control method and a storage medium for the information processing apparatus.

According to a first aspect of this invention, there is provided an information processing apparatus able to communicate with an image processing apparatus via a network, which comprises a transmission unit configured to transmit first data that requests the image processing apparatus to notify the information processing apparatus of occurrence of an event in the image processing apparatus, a registration unit configured to register a transmission source address of second data transmitted from the image processing apparatus in reply to the first data transmitted by the transmission unit, a first comparison unit configured to compare a transmission source address of third data transmitted by the image processing apparatus to notify occurrence of an event with the transmission source address registered in the registration unit, and a processing unit configured to execute processing for the event notified by the third data in a case where a result of comparison by the first comparison unit indicates that the transmission source address of the third data coincides with the transmission source address registered in the registration unit.

According to a second aspect of this invention, there is provided a control method for the information processing apparatus described in the first aspect.

According to a third aspect of this invention, there is provided a storage medium storing a program for executing the control method described in the second aspect.

With this invention, even if a transmission destination address of an event notification request differs from a transmission source address of an event notification, the information processing apparatus is able to associate an image processing apparatus to which the event notification request has been made with an image processing apparatus from which the event notification has been transmitted. When notified of an occurrence of an event (such as a state of image processing apparatus or a job state) from an image processing apparatus having multiple addresses, the information processing apparatus is able to correctly identify the image processing apparatus from which the event notification has been transmitted and perform appropriate processing.

Further features of the present invention will become apparent from the following description of exemplary embodiments with reference to the attached drawings.

BRIEF DESCRIPTION OF THE DRAWINGS

FIG. 7 is a view showing the construction of an MFP management table held in the PC;

FIG. 8 is a view showing the construction of an event notification destination management table held in the MFP;

FIG. 13 is a view showing the construction of an MFP management table held in a PC according to a second embodiment of this invention;

DETAILED DESCRIPTION OF THE PREFERRED EMBODIMENTS

The present invention will now be described in detail below with reference to the drawings showing preferred embodiments thereof.

First Embodiment

Figure 1:
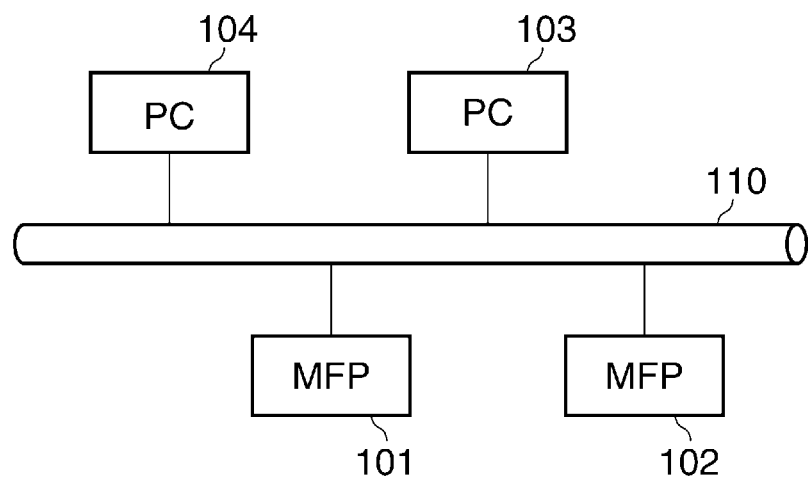
FIG. 1 is a view showing an exemplar construction of a network system that includes information processing apparatuses (PCs) according to a first embodiment of this invention.

FIG. 1 shows an example construction of a network system that includes information processing apparatuses according to a first embodiment of this invention.

As shown in FIG. 1, the network system includes image processing apparatuses and information processing apparatuses, which are connected via a network for communication with one another. In this embodiment, the image processing apparatuses are implemented by MFPs (multi-function peripherals) 101, 102, the information processing apparatuses are implemented by PCs (personal computers) 103, 104, and the network is implemented by a LAN 110.

The MFPs 101, 102 each include an image reading unit (scanner engine) and an image forming unit (printer engine), and each have an image reading function and an image forming function. The MFPs 101, 102 perform scanning to read an image from an original by the scanner engine, copying a read image to a recording sheet, transmitting a read image to the LAN 110, and printing to form an image received via the LAN 110 onto a recording sheet by the printer engine. It is assumed in this embodiment that the MFP 101 has two IPv6 addresses of 2001:db8:aaaa::a/64 and 2001:db8:bbbb::b/64, and the MFP 102 also has two IPv6 addresses.

The PCs 103, 104 are connected via the LAN 110 to the MFPs 101, 102 and able to manage the states of the MFPs and jobs (scan, print, copy, or the like) being processed in the MFPs. In this embodiment, it is assumed that the PC 103 has two IPv6 addresses of 2001:db8:abcd::e/64 and 2001:db8:cccc::c/64, and the PC 104 also has two IPv6 addresses.

Figure 2:
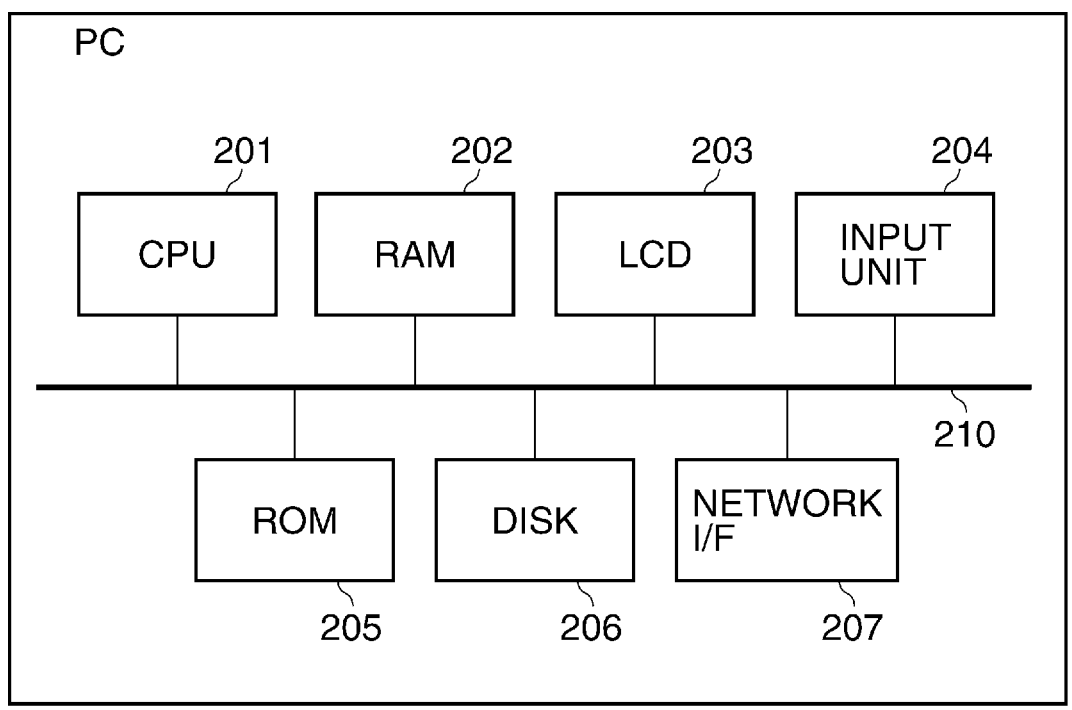
FIG. 2 is a block diagram showing an exemplar hardware construction of the PCs.

FIG. 2 shows in block diagram an example hardware construction of the PCs 103, 104.

As shown in FIG. 2, the PCs 103, 104 are each comprised of a CPU 201, RAM 202, LCD (liquid crystal display) 203, input unit 204, ROM 205, disk 206, and network I/F (interface) 207, which are connected to a system bus 210.

The CPU 201 controls various parts of the PC, communicates with MFPs connected to the CPU 201 via the network I/F 207 and the LAN 110, causes the LCD 203 to display a message to a user, and accepts a user's input via the input unit 204. Based on a control program (program code), the CPU 201 performs processing which will be described later with reference to flowcharts of FIGS. 9, 10, 14, and 15.

The RAM 202 is used by the CPU 201 as a work area and a temporary storage area. Data to be processed by the PC and the control program for the PC are stored in the ROM 205 or the disk 206. The control program is read into the RAM 202 and executed by the CPU 201, as needed. The disk 206 is implemented by a hard disk or the like.

The LCD 203 presents various displays under the control of the CPU 201. The input unit 204 is used by a user to input various data or instructions to the PC. The network I/F 207 provides an interface for communication between the PC and the MFPs. The network I/F 207 is implemented by, e.g., an Ethernet (registered trademark) I/F, USB standard compatible serial I/F, IEEE 1394 standard compatible serial I/F, or Bluetooth or other wireless communication network I/F.

In this embodiment, unless otherwise specified, the CPU 201 of the PC receives a user's input from the input unit 204 via the system bus 210 and controls various parts of the PC (including from the RAM 202 to the network I/F 207) via the system bus 210 to execute various processing.

Figure 3:
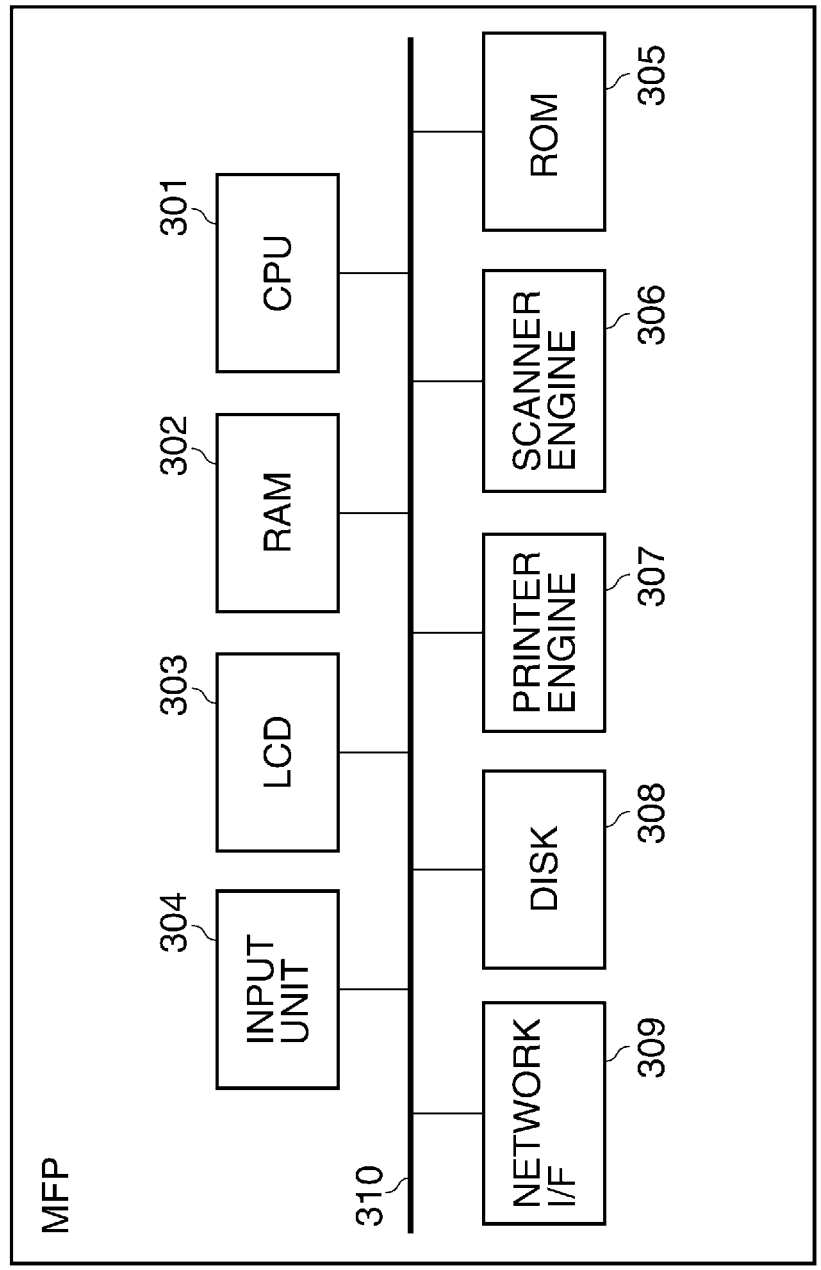
FIG. 3 is a block diagram showing an exemplar hardware construction of MFPs that constitute the network system.

FIG. 3 shows in block diagram an example hardware construction of the MFPs 101, 102.

As shown in FIG. 3, each of the MFPs 101, 102 includes a CPU 301, RAM 302, LCD 303, input unit 304, ROM 305, scanner engine 306, printer engine 307, disk 308, and network interface I/F 309, which are connected to a system bus 310.

The CPU 301 controls various parts of the MFP, communicates with PCs connected to the MFP via the network I/F 307 and the LAN 110, causes the LCD 303 to display a message to a user, and accepts a user's input via the input unit 304. Based on the control program, the CPU 301 executes processing which will be described later with reference to flowcharts of FIGS. 11 and 12.

The RAM 302 is used by the CPU 301 as a work area and a temporary storage area. The control program for the MFP is stored in the ROM 305 or the disk 308, and read into the RAM 302 and executed by the CPU 301, as needed. Attribute information that represents the function and state of a job to be processed by the MFP, job data to be printed out, job data externally received and stored, etc. are stored in the ROM 305 or the disk 308. The disk 308 is implemented by, e.g., a hard disk.

The LCD 303 presents various displays under the control of the CPU 301. The input unit 304 is used by a user to input various data or instructions to the MFP. The scanner engine 306 performs scanning to read an image from an original. The printer engine 307 performs copying an original image to a recording sheet and printing to form an externally received image on a recording sheet. The network I/F 309 provides an interface for communication between the MFP and PCs. The network I/F 307 is implemented by, e.g., an Ethernet (registered trademark) I/F, USB standard compatible serial I/F, IEEE 1394 standard compatible serial I/F, or Bluetooth or other wireless communication network I/F.

The MFP is able to perform a scan job to read a paper document and create image data by using the scanner engine 306, a print job to output externally received data by using the printer engine 307, and a copy job to copy a paper document by using the scanner engine 306 and the printer engine 307.

In this embodiment, unless otherwise specified, the CPU 301 of the MFP receives a user's input from the input unit 304 via the system bus 310 and controls various parts of the MFP (including from the RAM 302 to the network I/F 309) via the system bus 310 to execute various processing.

The following are definitions of terms regarding various processing in the PCs and the MFPs of this embodiment and regarding phenomena relating to mutual communication between the PCs and the MFPs. A term "job" refers to processing performed by each MFP such as printing (print, copy), scanning, FAX transmission, FAX reception, document storage, and document transmission. A term "job state change notification" refers to a notification of a change in job state (where the job is waiting to be executed, or is being executed, or has been processed).

A term "event" refers to a phenomenon occurring in any of the MFPs and including a change in a state of job (scan job, copy job, print job, or the like) processed in any of the MFPs. A term "event notification" refers to a notification of occurrence of and content of an event, which is sent from any of the MFPs to a preregistered notification destination PC upon occurrence of the event in the MFP. A term "event notification request" refers to a request in accordance with which each MFP will transmit an event notification to the PC upon occurrence of an event in the MFP.

Next, with reference to FIG. 4, a description will be given of the structure of an event notification request packet, which is generated by the PC 103 and transmitted therefrom to the MFP 101. A similar event notification request packet can be transmitted from the PC 103 to the MFP 102 and from the PC 104 to the MFPs 101, 102.

Figure 4:
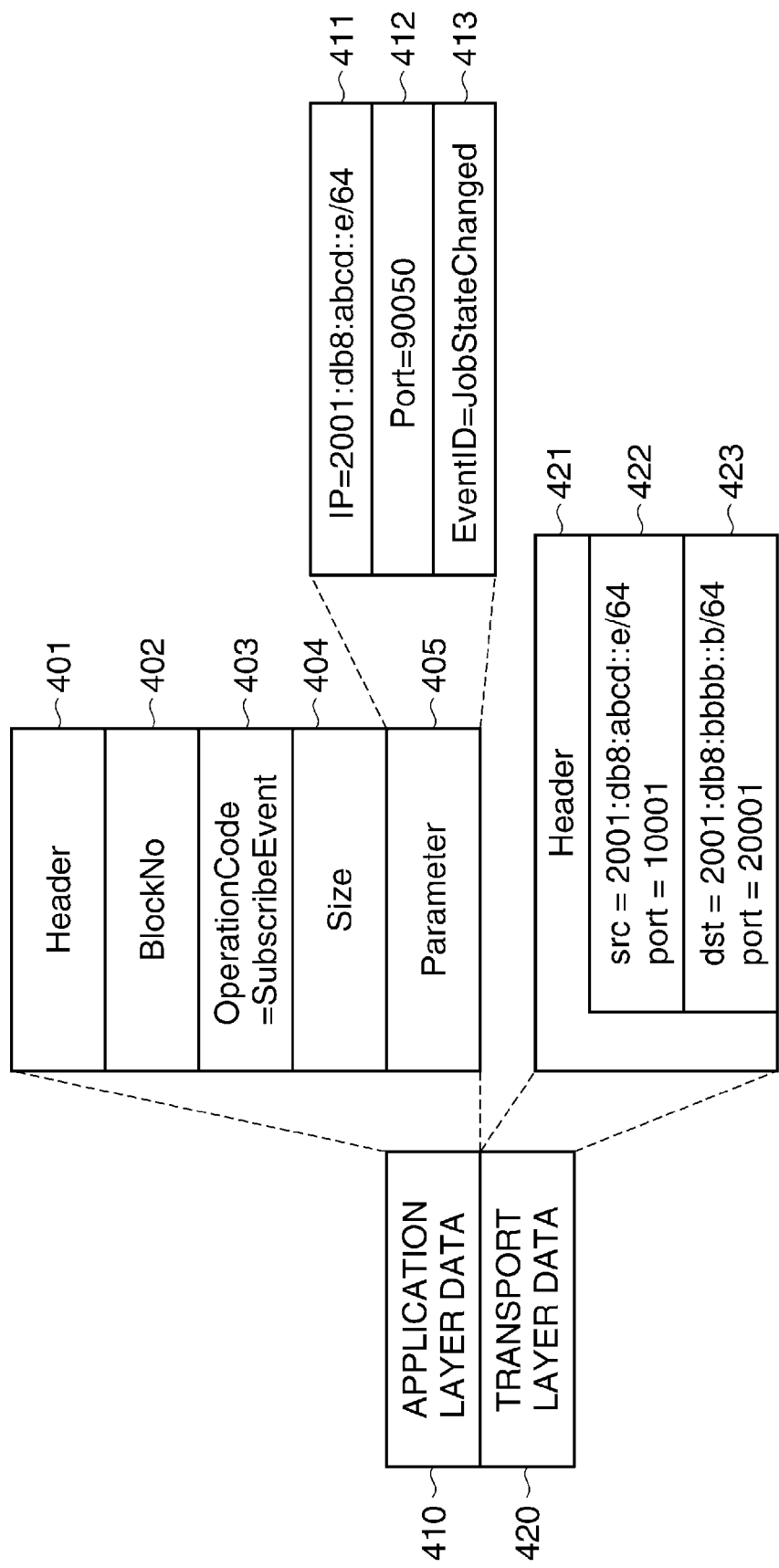
FIG. 4 is a view showing the construction of an event notification request packet transmitted from one of the PCs to one of the MFPs.

FIG. 4 shows the structure of the event notification request packet. It should be noted that the packet structure shown in FIG. 4 is one example. In embodying this invention, the packet content, identifier, storage order, and other details are not limitative.

As shown in FIG. 4, the event notification request packet includes application layer data 410 and transport layer data 420. The application layer data 410 includes a Header part 401, BlockNo part 402, OperationCode part 403, Size part 404, and Parameter part 405. The Parameter part 405 includes an IP part 411, Port part 412, and EventID part 413. The transport layer data 420 includes a Header part 421, transmission source address part 422, and transmission destination address part 423.

The Header part 401 stores information (including a protocol identifier, protocol version, and reply request flag), which is proper to application protocol and does not depend on a code stored in the OperationCode part 403. When receiving the event notification request packet from the PC 103, the MFP 101 is able to determine, by referring to the information stored in the Header part 401, whether the protocol is processable.

The BlockNo part 402 stores a BlockNo value (which is an arbitrary value assigned by the PC 103) representing a transmission source of the event notification request packet. A BlockNo value corresponding to the BlockNo value stored in the BlockNo part 402 of the event notification request packet is stored in a response packet, which is sent back in reply to the event notification request packet. In other words, the event notification request packet and the response packet associated therewith are made to correspond to each other.

The OperationCode part 403 stores a code that identifies the type of operation of the application protocol (e.g., a "SubscribeEvent" code that represents an event notification request). The Parameter part 405 stores a parameter corresponding to the code stored in the OperationCode part 403. Since the parameter stored in the Parameter part 405 is variable in length, the Size part 404 stores information that represents the size of the parameter stored in the Parameter part 405.

The IP part 411 of the Parameter part 405 stores a transmission destination IP address of an event notification (i.e., an IP address of the PC 103 for reception of an event notification packet (2001:db8:abcd::e/64 in the case of FIG. 4)) upon occurrence of an event in any of the MFPs. The Port part 412 stores a port number (port 90050 in the case of FIG. 4) for reception of the event notification packet at the IP address stored in the IP part 411. The port number is a fixed value, if event notification packets from the MFPs 101, 102 are received at one port. The EventID part 413 stores an identifier that represents an event for which the event notification is to be requested. In FIG. 4, a "JobStateChanged" identifier stored in the EventID part 413 represents a job state change event.

The Header part 421 of the transport layer data 420 stores header information of the transport layer. The transmission source address part 422 stores an IP address and port number of the transmission source PC 103. The transmission destination address part 423 stores an IP address and port number of the transmission destination MFP 101.

Next, with reference to FIG. 5, a description will be given of the structure of a response packet transmitted (sent back) from the MFP 101 to the PC 103 in reply to the event notification request packet in FIG. 4. A similar response packet can be transmitted from the MFP 102 to the PC 103 and from the MFPs 101, 102 to the PC 104.

Figure 5:
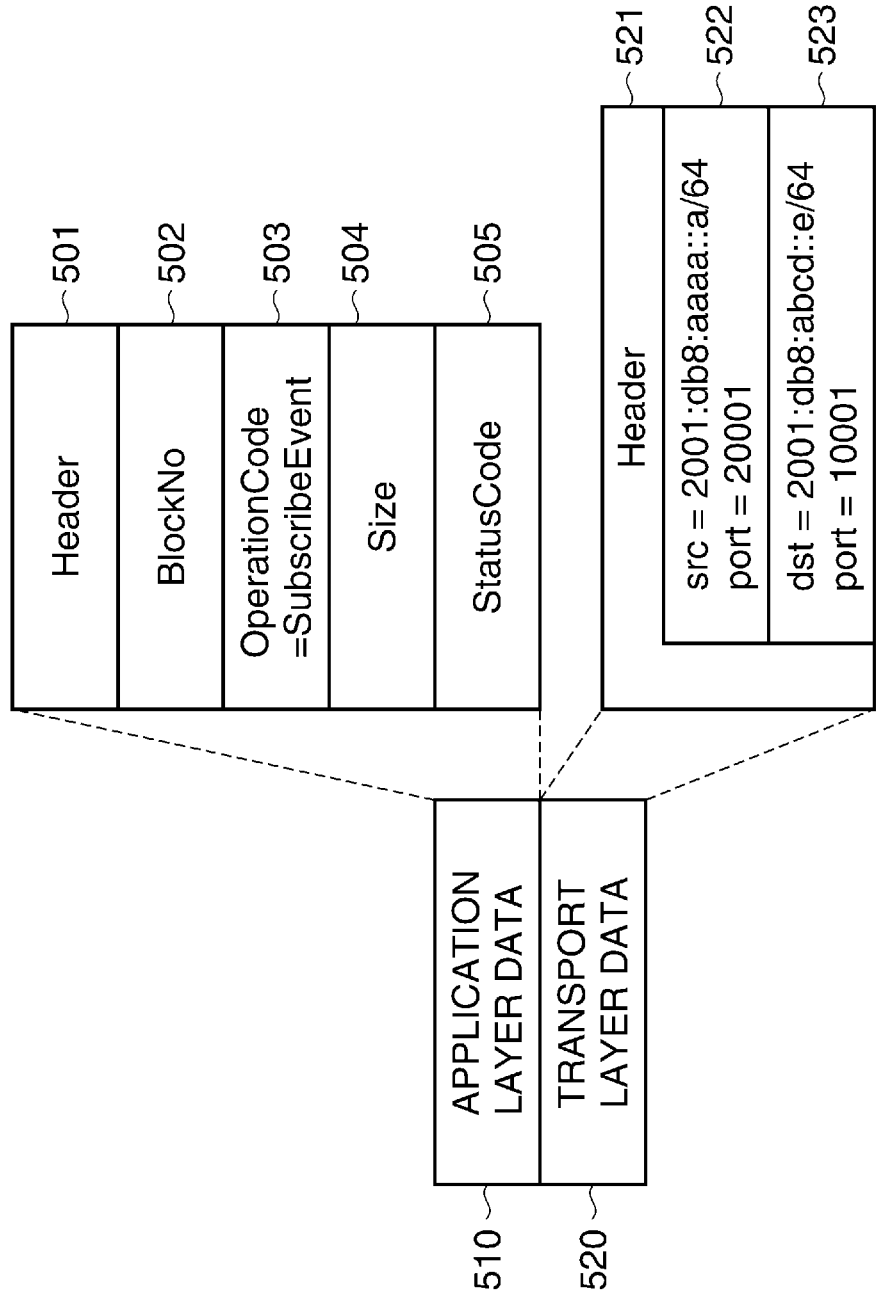
FIG. 5 is a view showing the construction of a response packet transmitted from the MFP to the PC in reply to the event notification request.

FIG. 5 shows the structure of a response packet transmitted from the MFP 101 to the PC 103. It should be noted that the structure of the response packet shown in FIG. 5 is one example. In embodying this invention, the response packet content, identifier, storage order, and other details are not limitative.

As shown in FIG. 5, the response packet includes application layer data 510 and transport layer data 520. The application layer data 510 includes a Header part 501, BlockNo part 502, OperationCode part 503, Size part 504, and StatusCode part 505. The transport layer data 520 includes a Header part 521, transmission source address part 522, and transmission destination address part 523.

The Header part 501 stores information (including a protocol identifier, protocol version, and reply request flag), which is proper to application protocol and does not depend on a code stored in the OperationCode part 503. When receiving the response packet from the MFP 101, the PC 103 is able to determine, by referring to the information stored in the Header part 501, whether the protocol is processable.

The BlockNo part 502 stores a BlockNo value by which the event notification request packet is made to correspond to the response packet associated therewith. As the BlockNo value, a serial number or other value is stored that corresponds to the BlockNo value stored in the BlockNo part 402 of the event notification request packet.

Based on the BlockNo value in the BlockNo part 502 of the response packet sent back from the MFP 101 and the BlockNo value in the BlockNo part 402 of the event notification request packet, the PC 103 is able to identify to which of event notification request packets the response packet responds.

The OperationCode part 503 stores a code that identifies the type of operation of the application protocol. The code stored in the OperationCode part 503 is the same as the code in the OperationCode part 403 of the event notification request packet corresponding to the response packet. The StatusCode part 505 stores information corresponding to the code in the OperationCode part 503. In FIG. 5, the information stored in the StatusCode part 505 is a status code indicating a result of processing on a "SubscribeEvent" code (the result is "OK", if the processing has normally been completed). The Size part 504 stores information that represents the size of the parameter stored in the Parameter part 505.

The transport layer data 520 is configured similarly to the transport layer data 420 shown in FIG. 4. The transmission source address part 522 stores an IP address and port number (e.g., 2001:db8:aaaa::a/64 and 20001) of the MFP 101. The transmission destination address part 523 stores an IP address and port number (e.g., 2001:db8:abcd::e/64 and 10001) of the PC 103.

The IP address to be stored in the transmission source address part 522 is selected from among the IP addresses of the MFP 101 according to the longest match with the IP address stored in the transmission destination address part 523. For example, the two IP addresses 2001:db8:aaaa::a/64 and 2001:db8:bbbb::b/64 of the MFP 101 are each compared with the IP address 2001:db8:abcd::e/64 stored in the transmission destination address part 523 in FIG. 5, whereby the address 2001:db8:aaaa::a/64 is selected.

Next, with reference to FIG. 6, a description will be given of the structure of an event notification packet generated by the MFP 101 and then transmitted to the PC 103. A similar event notification packet can be transmitted from the MFP 102 to the PC 103 and from the MFPs 101, 102 to the PC 104.

Figure 6:
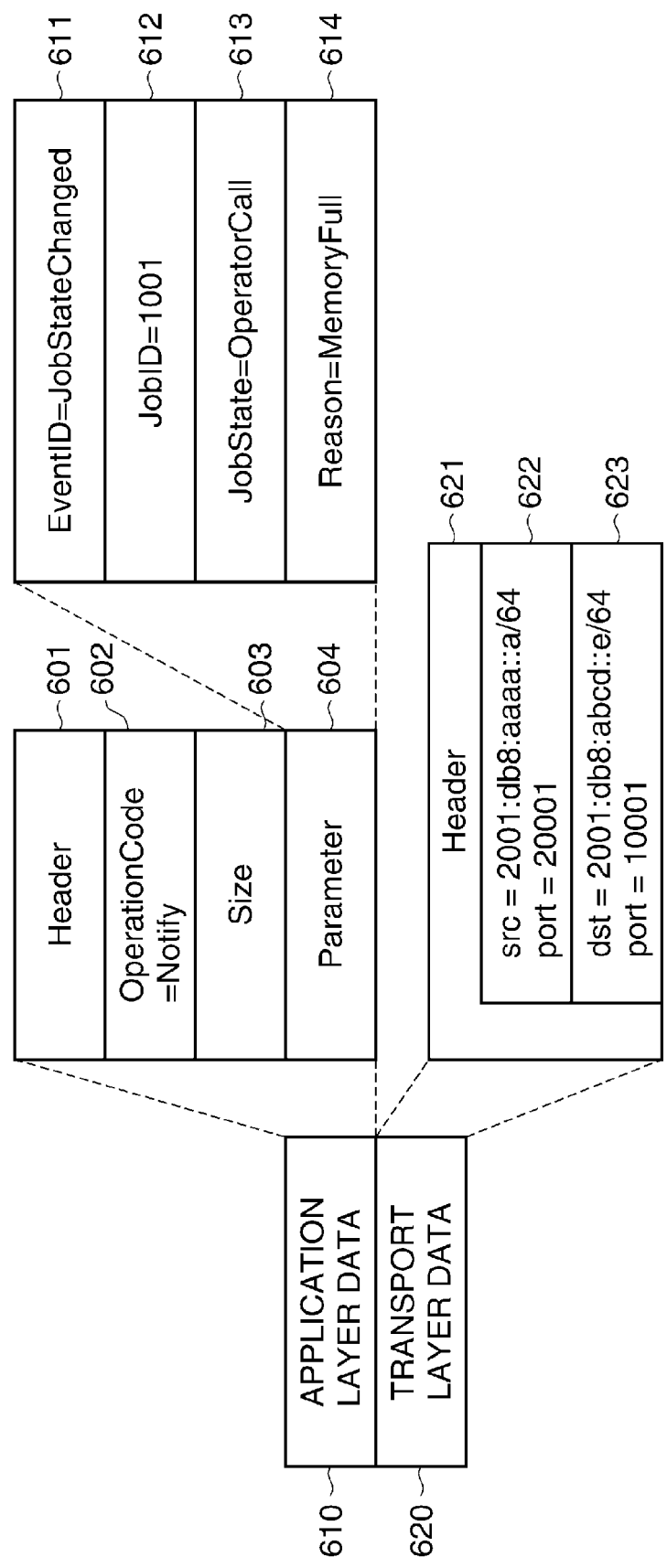
FIG. 6 is a view showing the construction of an event notification packet transmitted from the MFP to the PC.

FIG. 6 shows the structure of an event notification packet. It should be noted that the structure of the event notification packet shown in FIG. 6 is one example. In embodying this invention, the event notification packet content, identifier, storage order, and other details are not limitative.

As shown in FIG. 6, the event notification packet includes application layer data 610 and transport layer data 620. The application layer data 610 includes a Header part 601, OperationCode part 602, Size part 603, and Parameter part 604. The Parameter part 604 includes an EventID part 611, JobID part 612, JobState part 613, and Reason part 614. The transport layer data 620 includes a Header part 621, transmission source address part 622, and transmission destination address part 623.

The Header part 601 stores information (including protocol identifier and protocol version), which is proper to application protocol and does not depend on a code stored in the OperationCode part 602. When receiving the event notification packet from the MFP 101, the PC 103 is able to determine, by referring to the information stored in the Header part 601, whether the protocol is processable.

The OperationCode part 602 stores a code that identifies the type of operation of the application protocol (e.g., a "Notify" code that represents an event notification transmitted from the MFP 101 to the PC 103). The Size part 603 stores information that represents the size of parameter (event notification content) stored in the Parameter part 604.

The EventID part 611 of the Parameter part 604 stores an identifier that represents an event notified from the MFP 101 to the PC 103. A "JobStateChanged" identifier in FIG. 6 represents a job state change event. The JobID part 612 stores an identifier that represents a job for which an event notification is to be made. The PC 103 receives an event notification from the MFP 101, processes the event notification, and designates a value of, e.g., 1001 as the job identifier, to thereby be able to refer to and operate a job for which the event notification has been made.

The JobState part 613 stores an identifier that represents a job state. An "OperatorCall" identifier in FIG. 6 represents that an error has occurred, for which an operator's operation is required. The Reason part 614 stores an identifier that represents the cause of occurrence of the job state represented by the identifier stored in the JobState part 613. A "MemoryFull" identifier in FIG. 6 represents that memory shortage has occurred in the MFP 101.

The transport layer data 620 is configured similarly to the transport layer data 420, 520 shown in FIGS. 4 and 5. A transmission source address part 622 stores an IP address and port number (e.g., 2001:db8:aaaa::a/64 and 20001) of the MFP 101. A transmission destination address part 623 stores an IP address and port number (e.g., 2001:db8:abcd::e/64 and 10001) of the PC 103.

It should be noted that the example structure of the event notification packet shown in FIG. 6 is used to notify the PC 103 of a state change event for a job processed in the MFP 101. The event notification packet can include contents (other than the illustrated ones) such as a character string that represents a job name and a display character string that is used to display the received event notification. The event notification packet structure may vary between events to be notified. Even if events to be notified are the same as one another, the packet structure may vary according to states to be notified or according to event notification requests registered beforehand.

Next, with reference to FIG. 7, a description will be given of the structure of an MFP management table held in a storage device (ROM or disk) of the PC 103. A similar MFP management table can be provided in the PC 104.

FIG. 7 shows the structure of an MFP management table held by the PC 103.

As shown in FIG. 7, the MFP management table includes a management ID field 701, device ID field 702, event registration field 703, and IP address field 704. The management ID field 701 stores index numbers that are the same in number as MFPs managed by the PC 103. The device ID field 702 stores IDs that enable the PC 103 to identify respective MFPs (devices). These IDs can be generated by the PC 103 or can be acquired from the respective MFPs.

The event registration field 703 stores pieces of information each representing whether an event notification request has been made to a corresponding one of the MFPs identified by the IDs in the device ID field 702. If information in the event registration field 703 is ON, it is indicated that an event notification request has been made to the corresponding MFP. If information in the field 703 is OFF, it is indicated that an event notification request has not been made to the corresponding MFP. The IP address field 704 stores IPv4 addresses or IPv6 addresses of MFPs on the LAN 110, which are identified by the PC 103.

Next, with reference to FIG. 8, a description will be given of the structure of an event notification destination management table held in a storage device (ROM or disk) of the MFP 101. A similar event notification destination management table is provided in the MFP 102.

FIG. 8 shows the structure of an event notification destination management table held in the MFP 101.

As shown in FIG. 8, the event notification destination management table includes a management ID field 801, notification destination IP address field 802, notification destination port number field 803, and notification object event field 804. The management ID field 801 stores index numbers which are the same in number as event notification destination PCs registered in the MFP 101.

The notification destination IP address field 802 stores IP addresses of transmission destination PCs to each of which an event notification is to be transmitted from the MFP 101. The notification destination port number filed 803 stores notification destination (transmission destination) PC port numbers to each of which an event notification is to be transmitted from the MFP 101. The notification object event field 804 stores identifiers representing respective ones of events to be notified from the MFP 101 to PCs (hereinafter, referred to as the notification object events).

Next, operation of the network system of this embodiment having the above construction will be described with reference to FIGS. 9 to 12.

Figure 9:
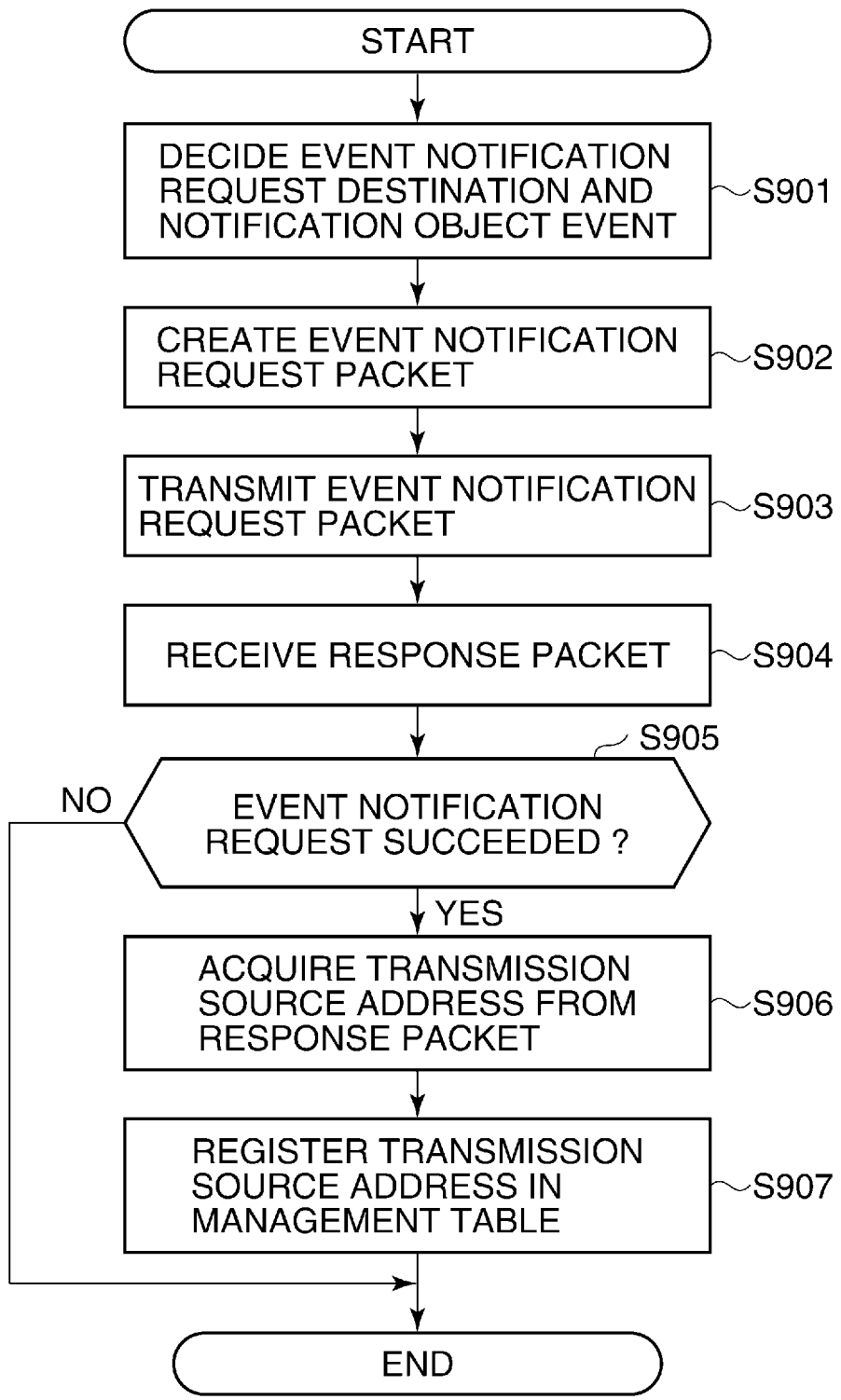
FIG. 9 is a flowchart showing a process performed by the PC to register, into the MFP management table, an MFP to which the event notification request has been made.

FIG. 9 shows in flowchart a process performed by the PC 103 to register, into the MFP management table, an MFP to which the event notification request has been made.

Referring to FIG. 9, in step S901, the CPU 201 of the PC 103 decides an MFP to which the event notification request should be made and decides a notification object event. The MFP to which the event notification request should be made can be set by a user or can be decided by finding management object MFPs on the LAN by broadcasting an MFP search packet. As the notification object event, an event that will be received from the MFP and processed by the PC 103 can be set.

In step S902, the CPU 201 creates an event notification request packet used for the event notification request and having the construction shown in FIG. 4. Further, the IP address of the MFP to which the event notification request should be transmitted is stored into the transmission destination address part 423 of the event notification request packet, and the IP address of the PC 103 is stored into the transmission source address part 422 of the event notification request packet.

In step S903, the CPU 201 transmits, via the network I/F 209 and the LAN 110, the event notification request packet created in step S902 to the IP address of the MFP decided in step S901.

In step S904, the CPU 201 receives a response packet having the construction shown in FIG. 5 and sent from the MFP in reply to the event notification request transmitted in step S903. As previously described, the CPU 201 is able to determine that the response packet has been sent in reply to the event notification request transmitted in step S903 by referring to values in the Header part 501, BlockNo part 502, and OperationCode part 503 of the response packet.

In step S905, the CPU 201 determines whether the event notification request to the MFP has succeeded (OK) or failed (NG) by referring to the information stored in the StatusCode part 505 of the response packet received from the MFP in step S904. If the event notification request to the MFP has succeeded, the flow proceeds to step S906. If the event notification request to the MFP has failed, the present process is completed.

In step S906, the CPU 201 reads the IP address from the transmission source address part 522 of the response packet. It should be noted that the IP address read in step S906 from the transmission source address part 522 may not coincide with the IP address in the transmission destination address part 423 of the event notification request packet created in step S902.

In step S907, the CPU 201 of the PC 103 registers, into the IP address field 704 of the MFP management table, the IP address read in step S906 from the transmission source address part 522, as the IP address of the MFP to which the event notification request has been made. Specifically, the transmission source address is acquired from the response packet sent from the MFP in reply to the event notification request of the PC 103, and the acquired address is registered as the address of the apparatus to which the event notification request has been made. Further, the information in the event registration field 703 of the MFP management table is set to be ON to thereby represent that the event registration has been made. Then, the present process is completed.

Figure 10:
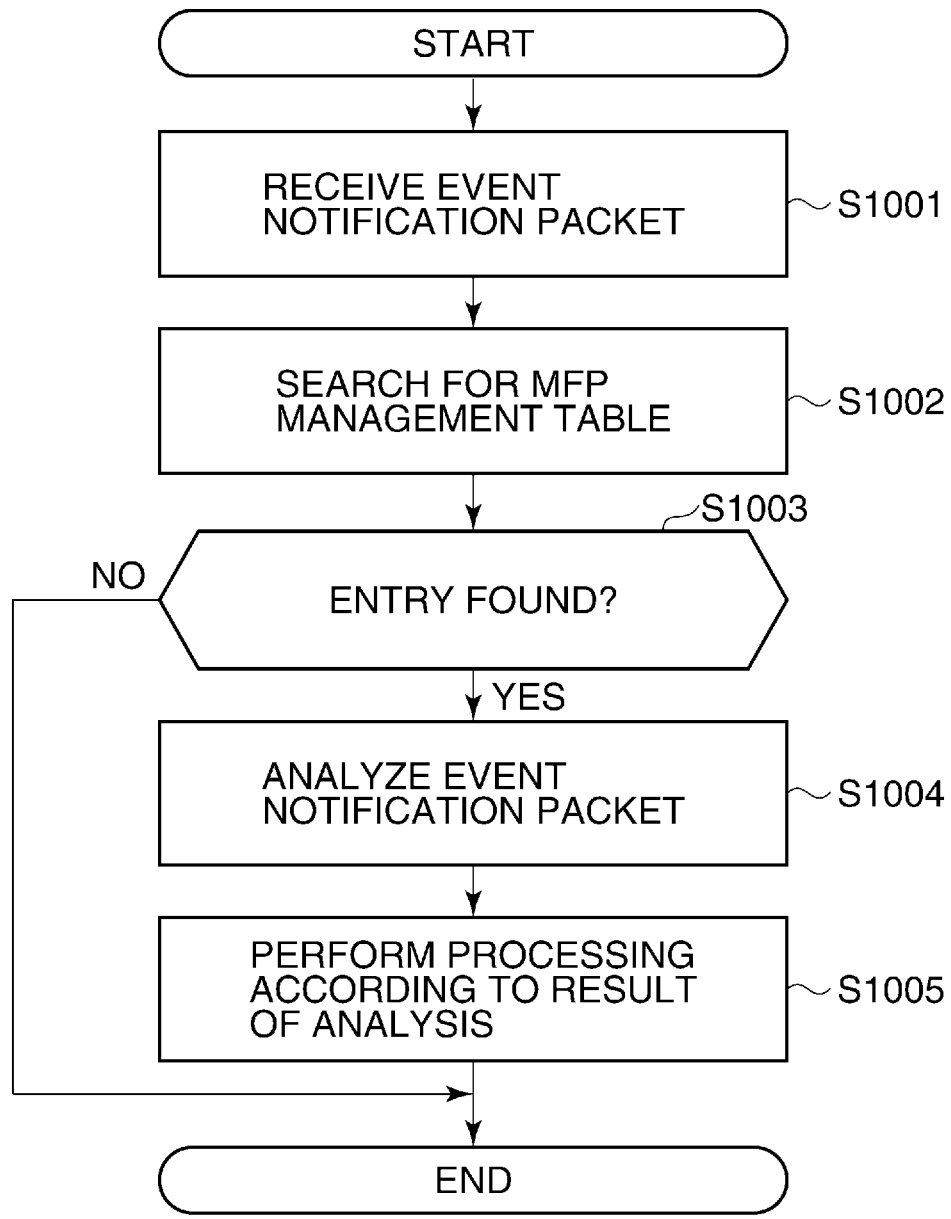
FIG. 10 is a flowchart showing a process performed by the PC based on an event notification packet received from the MFP.

FIG. 10 shows in flowchart a process performed by the PC 103 based on an event notification packet received from the MFP 101.

Referring to FIG. 10, in step S1001, the CPU 201 of the PC 103 receives, via the LAN 110 and the network I/F207, an event notification packet transmitted from the MFP 101 and having the construction shown in FIG. 6. Then, the CPU 201 reads an IP address from the transmission source address part 622 of the event notification packet.

In step S1002, in order to determine whether the event notification packet received from the MFP 101 is transmitted from an MFP to which the event notification request has been made, the CPU 201 searches for the MFP management table shown in FIG. 7 by using, as a key, the IP address read from the event notification packet in step S1001.

In step S1003, the CPU 201 determines a result of the search performed in step S1002. If the entry of the MFP 101 in the MFP management table is found by the search (i.e., if the IP address read from the event notification packet coincides with any of the IP addresses registered in the MFP management table), the flow proceeds to step S1004. If the entry of the MFP 101 in the MFP management table is not found, the received event notification packet is discarded and the present process is completed.

In step S1004, the CPU 201 analyzes the event notification packet received from the MFP 101. In the case of the event notification packet shown in FIG. 6, by reading the information in the Header part 601 through the Parameter part 604 of the packet, it is understood that the event notification packet has been transmitted from the MFP 101 and that a job state has been changed to an operator-call state due to the occurrence of memory-full during the execution of a job represented by the identifier of 1001 in the JobID part 612 of the packet.

In step S1005, the CPU 201 of the PC 103 performs processing according to a result of the analysis performed in step S1004 on the event notification packet, whereupon the present process is completed.

It should be noted that in a case that the PC 103 receives from the MFP 101 the event notification packet shown in FIG. 6, user interface (UI) display can be provided to notify that the job is stopped by the operator-call, and a job cancel command can be transmitted, and so on (although not limitative). An event notification packet from the MFP 102 is processed similarly to that from the MFP 101. The PC 104 is also able to perform the above-described process.

Figure 11:
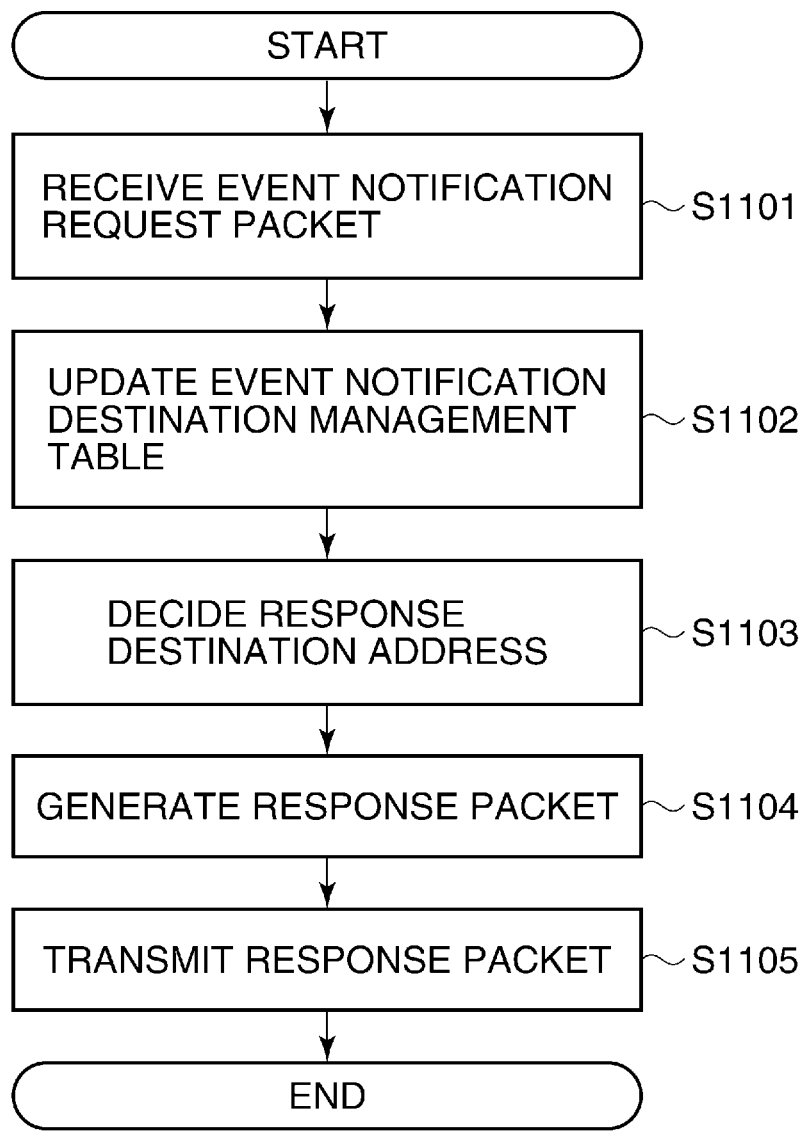
FIG. 11 is a flowchart showing a process performed by the MFP to transmit a response packet in reply to an event notification request transmitted from the PC.

FIG. 11 shows in flowchart a process performed by the MFP 101 to transmit a response packet in reply to an event notification request packet transmitted from the PC 103.

Referring to FIG. 11, in step S1101, the CPU 301 of the MFP 101 receives via the LAN 110 and the network I/F 309 an event notification request packet transmitted from the PC 103 and having the construction shown in FIG. 4.

In step S1102, the CPU 301 analyzes the event notification request packet received from the PC 103, and registers a result of the analysis into the event notification destination management table shown in FIG. 8. Specifically, values in the IP part 411, the Port part 412, and the EventID part 413 of the event notification request packet shown in FIG. 4 are registered into respective ones of the notification destination IP address field 802, the notification destination port number field 803, and the notification object event field 804 of the event notification destination management table, whereby the management table is updated.

In step S1103, the CPU 301 of the MFP 101 decides a response destination address to which a response packet is to be transmitted in reply to the event notification request (i.e., IP address in the transmission source address part 522 of the response packet shown in FIG. 5). Specifically, the CPU 301 acquires the IP address and the port number from the transmission source address part 422 of the event notification request packet received in step S1101, and sets, as the response destination address, one of IP addresses of the MFP 101 which is selected from among these IP addresses according to the longest match with the acquired IP address.

In step S1104, the CPU 301 generates the response packet shown in FIG. 5 based on the event notification destination management table updated in step S1102 and the response destination address decided in step S1103.

In step S1105, the CPU 301 transmits via the network I/F 309 and the LAN 110 the response packet generated in step S1104 to the IP address of the PC 103 decided in step S1103, whereupon the present process is completed. It should be noted that the MFP 102 is able to perform a similar response packet generation and transmission process, and the MFPs 101, 102 are each able to transmit a response packet to the PC 104.

Figure 12:
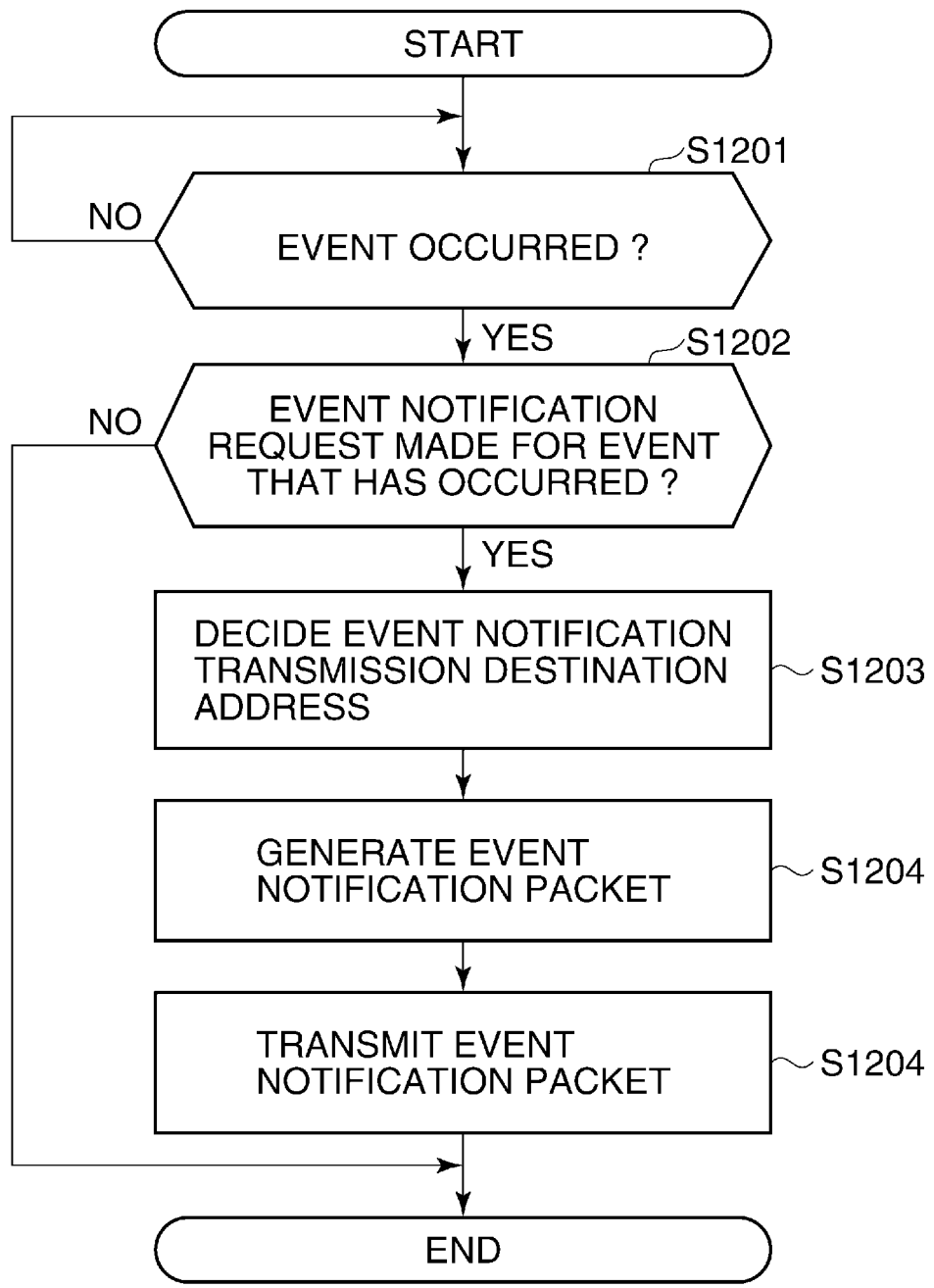
FIG. 12 is a flowchart showing a process performed by the MFP to transmit an event notification to the PC.

FIG. 12 shows in flowchart a process performed by the MFP 101 to transmit an event notification to the PC 103.

Referring to FIG. 12, in step S1201, the CPU 301 of the MFP 101 determines whether an event has occurred in the MFP 101. If an event has occurred in the MFP 101, the flow proceeds to step S1202.

In step S1202, in order to check whether the event notification request has been made by the PC 103 for the event detected in step S1201, the CPU 301 searches for the event notification destination management table shown in FIG. 8 and held in the MFP 101.

In a case, for example, that an identifier representing the occurring event is a "JobStateChanged" identifier (which represents a job state change), the notification object event field 804 of the event notification destination management table in FIG. 8 is searched for by using the "JobStateChanged" identifier as a key. In the example of FIG. 8, there are corresponding entries that include the "JobStateChanged" identifier in their notification object event field 804 and that are identified by the index numbers of 1 and 2 in their management ID field 801. If one or more entries are found in step S1202, the flow proceeds to step S1203. If no entry is found, the present process is completed.

In step S1203, the CPU 301 decides the IP address and port number of the event notification transmission destination for each of one or more entries found in step S1202. In the example of FIG. 8, the IP addresses in the notification destination IP address fields 802 and the port numbers in the notification destination port number fields 803 of the entries whose index numbers are 1 and 2 are decided as the IP addresses and port numbers of the event notification transmission destinations.

In step S1204, the CPU 301 generates one or more event notification packets (each having the structure shown in FIG. 6) based on the event detected in step S1201, the IP address and port number of the event notification transmission destination for each of one or more entries decided in step S1203, and the IP address of the MFP 101.

It should be noted that the IP address to be set in the transmission source address part 622 of the event notification packet shown in FIG. 6 is selected from among plural IP addresses of the MFP 101 by longest match with the IP address in the transmission destination address part 623 of the event notification. For example, an address of 2001:db8: aaaa::a/64 is selected from addresses of 2001:db8:aaaa::a/64 and 2001:db8:bbbb::b/64 by the comparison with the event notification transmission destination IP address of 2001:db8: abcd::e/64.

In step S1205, the CPU 301 transmits, via the network I/F 309 and the LAN 110, each of the one or more event notification packets generated in step S1204 to one or more PCs (the PC 103 in this example) each having the transmission destination IP address and port number decided in step S1203, whereupon the present process is completed. It should be noted that the MFP 102 is able to perform a similar event notification transmission process, and an event notification can be transmitted to the PC 104.

As described above, according to this embodiment, the following effect can be attained. Specifically, each PC is able to identify the event notification transmission source MFP as the MFP to which the event notification request has been transmitted from the PC, even if the transmission source IP address of the event notification differs from the IP address of the MFP to which the event notification request has been transmitted in advance.

More specifically, even if the event notification request transmission destination IP address differs from the event notification transmission source IP address, the PC is able to confirm, based on the PC's IP address stored in the transmission destination address part 623 of the event notification packet transmitted from the MFP, the correspondence between the MFP to which the event notification request has been made by the PC and the MFP that has transmitted the event notification to the PC. Accordingly, when the event notification representing an MFP state or a job state is transmitted from any of MFPs each having plural IP addresses, the PC is able to correctly identify the event notification transmission source MFP and perform appropriate processing.

Second Embodiment

A second embodiment of this invention differs from the first embodiment in points which will be described below referring to FIGS. 13 and 14. In other respects, the second embodiment is the same as the first embodiment (FIGS. 1 to 3) and therefore a description thereof is omitted.

FIG. 13 shows the construction of an MFP management table held in the PC 103 of the second embodiment.

As shown in FIG. 13, the MFP management table includes a management ID field 1301, device ID field 1302, event registration field 1303, first IP address field 1304, and second IP address field 1305. The management ID field 1301 stores index numbers that are the same in number as MFPs managed by the PC 103.

The device ID field 1302 stores IDs that enable the PC 103 to identify respective MFPs (devices). These IDs can be generated by the PC 103 or can be acquired from the respective MFPs. The event registration field 1303 stores pieces of information each representing whether an event notification request has been made to a corresponding one of the MFPs identified by the IDs in the device ID field 1302. If information in the event registration field 1303 is ON, it is indicated that an event notification request has been made to the corresponding MFP. If information in the field 1303 is OFF, it is indicated that an event notification request has not been made to the corresponding MFP.

The first IP address field 1304 stores first IP addresses (IPv4 addresses or IPv6 addresses) of MFPs on the LAN 110, which are identified by the PC 103. The second IP address field 1305 stores second IP addresses (IPv4 addresses or IPv6 addresses) of these MFPs.

It should be noted that the MFP management table shown in FIG. 13 is configured to store the two IP addresses (the first and second IP addresses) of each of the MFPs 101 and 102, but this is not limitative. The MFP management table can be configured to store three or more IP addresses.

Figure 14:
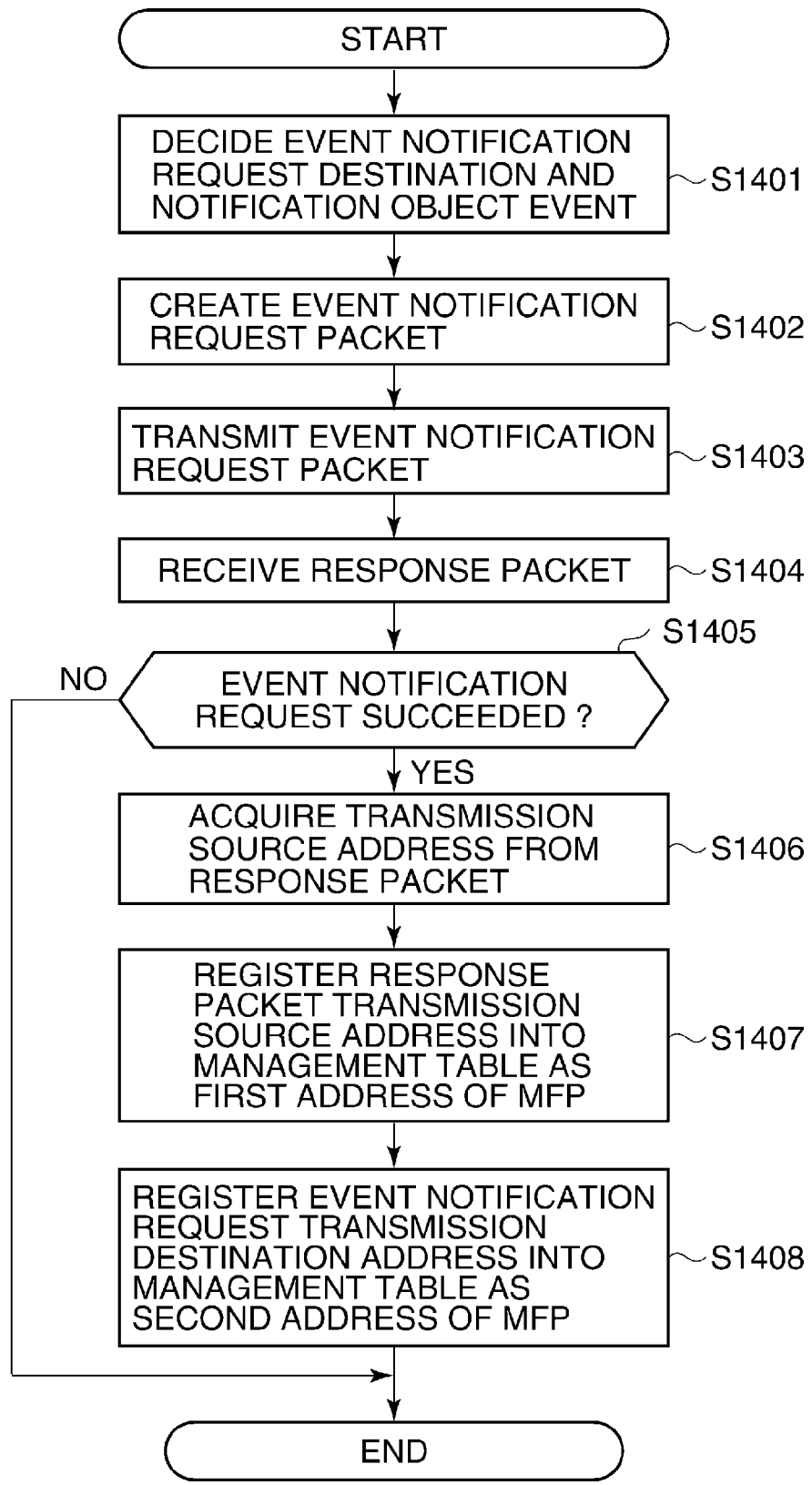
FIG. 14 is a flowchart showing a process performed by the PC to register, into the MFP management table, addresses of MFPs to each of which an event notification request has been made.

FIG. 14 shows in flowchart a process performed by the PC 103 to register, into the MFP management table, addresses of MFPs to each of which an event notification request has been made.

Referring to FIG. 14, insteps S1401 to S1406, the same processing as that in steps S901 to S906 in FIG. 9 described in the first embodiment is performed. A description of the processing in steps S1401 to S1406 is therefore omitted.

In step S1407, the CPU 201 of the PC 103 registers the address read in step S1406 from the transmission source address part 522 of the response packet into the first IP address field 1304 of the MFP management table shown in FIG. 13, as the first IP address of the MFP to which the event notification request has been made. Further, the information in the event registration field 1303 of the MFP management table is set to be ON to thereby represent that the event registration has been made.

In step S1408, the CPU 201 reads, from the transmission destination address part 423 of the event notification request packet transmitted in step S1403, the IP address of the MFP to which the event notification request has been transmitted, and registers the read IP address into the second IP address field 1305 of the MFP management table, as the second IP address of the MFP. Specifically, the transmission source address acquired from response packet sent back from the MFP in reply to the event notification request and the address of the MFP to which the event notification request has been transmitted are registered as the addresses of the apparatus to which the event notification request has been made.

As described above, according to this embodiment, the following effect can be attained. Specifically, each PC is able to receive the event notification which has been transmitted from the IP address different from the IP address of the MFP to which the event notification request has been transmitted beforehand, and also receive the event notification which has been transmitted from the IP address of the MFP to which the event notification request has been transmitted in advance. The received event notifications can each be processed as the event notification from the MFP to which the event notification request has been transmitted.

Third Embodiment

A third embodiment of this embodiment differs from the first embodiment in points which will be described below referring to FIG. 15. In other respect, the third embodiment is the same as the first embodiment (FIGS. 1 to 3), and therefore a description thereof is omitted.

Figure 15:
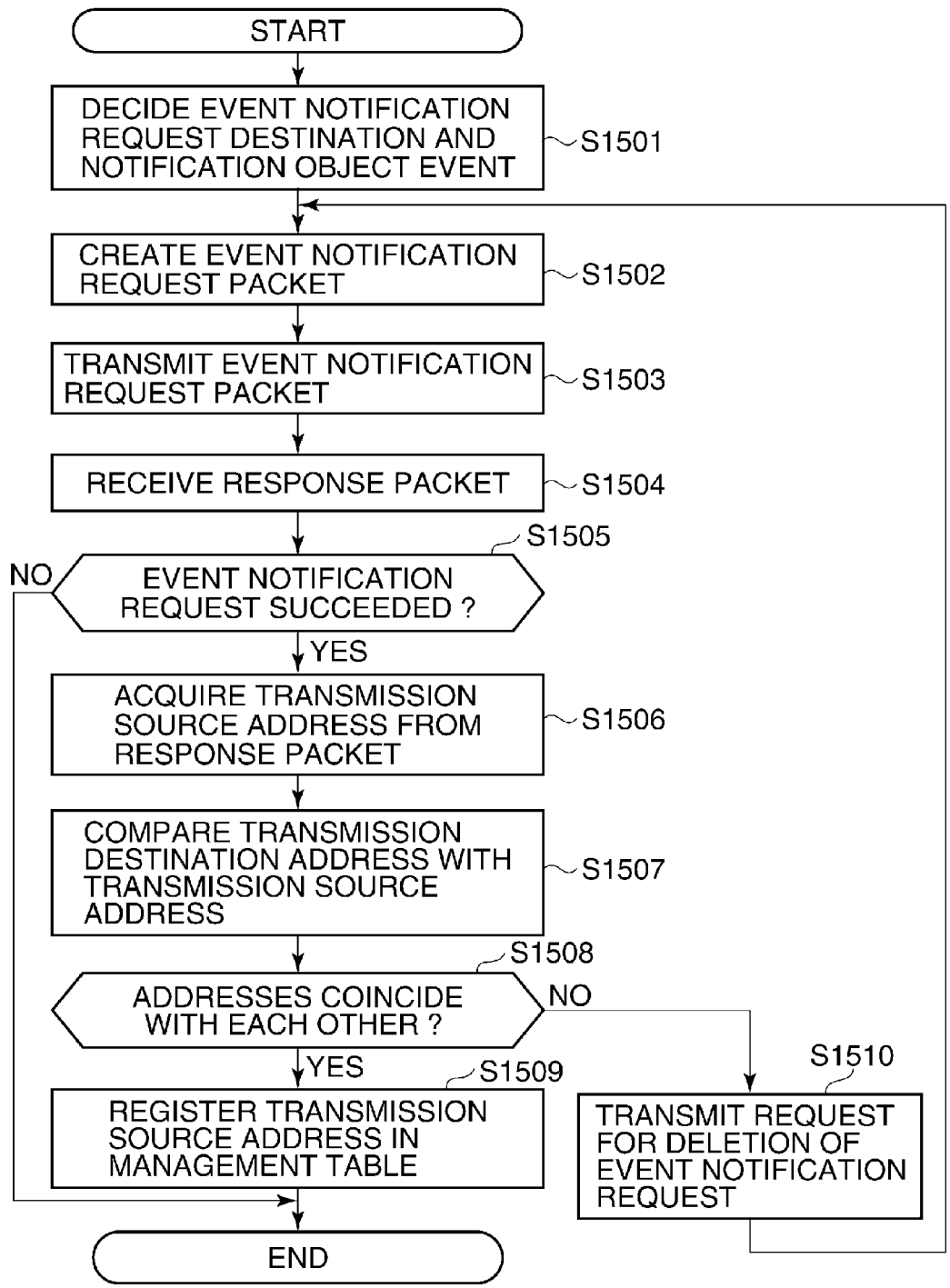
FIG. 15 is a flowchart showing a process performed by a PC according to a third embodiment of this invention to register, into an MFP management table, addresses of MFPs to each of which an event notification request has been made.

FIG. 15 shows in flowchart a process performed by the PC 103 of the third embodiment to register, into an MFP management table, addresses of MFPs to each of which an event notification request has been made.

Referring to FIG. 15, insteps S1501 to S1506, the same processing as that in steps S901 to S906 in FIG. 9 described in the first embodiment is performed. A description of the processing in steps S1501 to S1506 is therefore omitted.

In step S1507, the CPU 201 of the PC 103 reads, from the transmission destination address part 423 of the event notification request packet transmitted in step S1503, the IP address of the MFP to which the event notification request packet has been transmitted. Then, the CPU 201 compares the IP address read from the transmission destination address part 423 with the IP address read in step S1506 from the transmission source address part 522 of the response packet.

In step S1508, the CPU 201 determines a result of the comparison in step S1507. If both the IP addresses coincide with each other, the flow proceeds to step S1509. If the IP addresses differ from each other, the flow proceeds to step S1510. The processing in step S1509 is the same as that in step S907 in FIG. 9 already described in the first embodiment, and a description thereof is therefore omitted.

In step S1510, the CPU 201 transmits, to the address of the MFP to which the event notification request packet has been transmitted in step S1503, a request for deletion of the event notification request.

Next, the CPU 201 sets the IP address read in step S1506 as the address to which the event notification request is to be transmitted, whereupon the flow returns to step S1502. In step S1502, the event notification request packet is generated again. Then, the packet is transmitted to the MFP having the address equal to the transmission source address contained in the response packet.

As described above, according to this embodiment, the following effect can be attained. In a case where any of the PCs receives a response transmitted from the IP address different from the IP address of the MFP to which the event notification request has been transmitted in advance from the PC, the PC is able to retransmit the event notification request to the IP address from which the response packet has been transmitted. When receiving the event notification transmitted from the MFP in reply to the event notification request transmitted to the MFP, the PC is able to process the received event notification as an event notification transmitted from the MFP to which the event notification request has been transmitted.

Other Embodiments

In the first to third embodiments, the network system is configured as shown in FIG. 1 but this is not limitative. The number of network-connected information processing apparatuses (two in the embodiments) and the number and type of image processing apparatuses (two and MFP in the embodiments) can be selected according to network environment to be constructed.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-210493, filed Sep. 11, 2009, which is hereby incorporated by reference herein in its entirety.

What is claimed is:

1. An information processing apparatus able to communicate with an image processing apparatus having a plurality of addresses via a network, the information processing apparatus comprising:

a transmission unit configured to transmit, to the image processing apparatus, first data that requests the image processing apparatus to notify the information processing apparatus of occurrence of an event in the image processing apparatus;

a registration unit configured to register a transmission source address acquired from second data transmitted from the image processing apparatus in reply to the first data transmitted by said transmission unit;

a determination unit configured to determine whether a transmission source address of third data transmitted by the image processing apparatus to notify occurrence of an event coincides with the transmission source address registered by said registration unit; and a processing unit configured to execute processing for the event indicated by the third data in a case where the determination unit determines that the transmission source address of the third data coincides with the transmission source address registered by said registration unit, wherein said registration unit is configured to register the transmission source address acquired from the second data in a case where a destination address, based on which said transmission unit transmits the first data to the image processing apparatus, and the transmission source address acquired from the second data are different from each other.

2. The information processing apparatus according to claim 1, wherein said registration unit is configured to register a destination address acquired from the first data as well as the transmission source address acquired from the second data.

3. The information processing apparatus according to claim 1, further including:

a comparison unit configured to compare the transmission source address of the second data with the destination address of the first data, wherein said transmission unit is configured to change a destination address acquired from the first data to the transmission source address acquired from the second data and to retransmit the first data to the changed destination address in a case where a result of comparison by said comparison unit indicates that the transmission source address acquired from the second data differs from the destination address acquired from the first data.

4. A control method for an information processing apparatus able to communicate with an image processing apparatus having a plurality of addresses via a network, the method comprising:

a transmission step of transmitting, to the image processing apparatus, first data that requests the image processing apparatus to notify the information processing apparatus of occurrence of an event in the image processing apparatus;

a registration step of registering a transmission source address acquired from second data transmitted in reply to the first data transmitted in said transmission step;

a determination step of determining whether a transmission source address of third data transmitted by the image processing apparatus to notify occurrence of an event coincides with the transmission source address registered in said registration step; and a processing step of executing processing for the event indicated by the third data in a case where it is determined in the determination step that the transmission source address of the third data coincides with the transmission source address registered in said registration step, wherein said registration step includes registering the transmission source address acquired from the second data in a case where a destination address, based on which said transmission unit transmits the first data to the image processing apparatus, and the transmission source address acquired from the second data are different from each other.

5. A non-transitory computer-readable storage medium storing a computer-executable program configured to executed at least by a computer of an information processing apparatus able to communicate with an image processing apparatus having a plurality of addresses via a network, the program comprising:

transmission instructions configured to transmit, to the image processing apparatus, first data that requests the image processing apparatus to notify the information processing apparatus of occurrence of an event in the image processing apparatus;

registration instructions configured to register a transmission source address acquired from second data transmitted in reply to the first data transmitted according to said transmission instructions;

determination instructions configured to determine whether a transmission source address of third data transmitted by the image processing apparatus to notify occurrence of an event coincides with the transmission source address registered according to said registration instructions; and processing instructions configured to execute processing for the event indicated by the third data in a case where it is determined according to the determination instructions that the transmission source address of the third data coincides with the transmission source address registered according to said registration instructions, wherein said registration instructions are configured to register the transmission source address acquired from the second data in a case where a destination address, based on which said transmission unit transmits the first data to the image processing apparatus, and the transmission source address acquired from the second data are different from each other.

6. The information processing apparatus according to claim 1, wherein said transmission unit is configured to add identification information to the first data and to transmit, to the image processing apparatus, the first data with the identification information thereof added thereto, and said registration unit is configured to register the transmission source address acquired from the second data with identification information thereof added thereto.

7. The information processing apparatus according to claim 1, wherein said registration unit is configured to register the transmission source address acquired from the second data with information indicating the image processing apparatus.

8. The information processing apparatus according to claim 1, wherein each of the transmission source address of the second data and the transmission source address of the third data is an IPv6 address, and each of the plurality of addresses of the image processing apparatus is an IPv6 address.

* * * * *